United States Patent [19]
Martinez

[11] Patent Number: 4,747,114
[45] Date of Patent: May 24, 1988

[54] MODEM CLOCK WITH AUTOMATIC GAIN CONTROL

[75] Inventor: Aldo A. Martinez, Miami, Fla.

[73] Assignee: Racal Data Communications Inc., Sunrise, Fla.

[21] Appl. No.: 654,187

[22] Filed: Sep. 24, 1984

[51] Int. Cl.$^4$ .................... H04L 27/08; H04L 7/06
[52] U.S. Cl. ............................. 375/98; 375/106; 375/111; 375/118; 328/63
[58] Field of Search .............. 375/8, 106, 110, 118, 375/107, 109, 11, 111, 98, 94; 307/522, 523; 328/63, 138, 140, 168; 455/249

[56] References Cited

U.S. PATENT DOCUMENTS

| | | | |
|---|---|---|---|
| 3,020,479 | 2/1962 | Logan | 328/13 |
| 3,128,342 | 4/1964 | Baker . | |
| 3,128,343 | 4/1964 | Baker . | |
| 3,372,335 | 3/1968 | Takada | 455/71 |
| 3,393,308 | 7/1978 | Cope . | |
| 3,524,023 | 8/1970 | Whang . | |
| 3,581,222 | 5/1971 | Dunwoodie | 455/249 |
| 3,593,140 | 7/1971 | Kaneko | 375/118 |
| 3,905,034 | 9/1975 | Jensen et al. | 342/111 |
| 3,921,075 | 11/1975 | Denny . | |
| 3,993,952 | 11/1976 | Roza | 375/12 |
| 4,344,176 | 8/1982 | Qureshi | 375/15 |

OTHER PUBLICATIONS

Floyd M. Gardner, *Phaselock Techniques*, First Edition, 1966, pp. 55–58, 90–100.

D. L. Lyon, "Envelope Derived Timing Recovery in QAM and SQAM Systems," IEEE Transactions on Communications, vol. 23, No. 11, Nov. 1975, pp. 1327–1331.

D. L. Lyon, "Timing Recovery in Synchronous Equalized Data Communication," IEEE Transactions on Communications, vol. 23, No. 2, Feb. 1975, pp. 269–274.

*Primary Examiner*—Benedict V. Safourek
*Assistant Examiner*—M. Huseman
*Attorney, Agent, or Firm*—Roberts and Quiogue

[57] ABSTRACT

A modem receiver having a timing recovery circuit is disclosed. The timing recovery circuit includes circuitry for extracting timing information, multiplication circuitry responsive to the timing information for providing a clock envelope signal and processing circuitry for controlling the gain of the clock envelope signal as a function of the average power of the clock envelope signal.

14 Claims, 2 Drawing Sheets

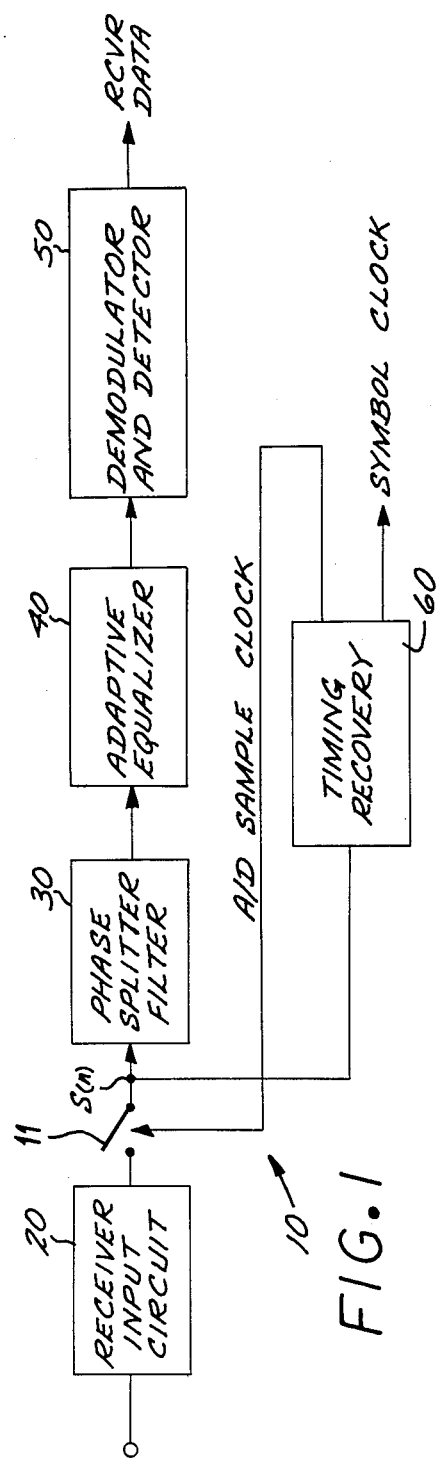
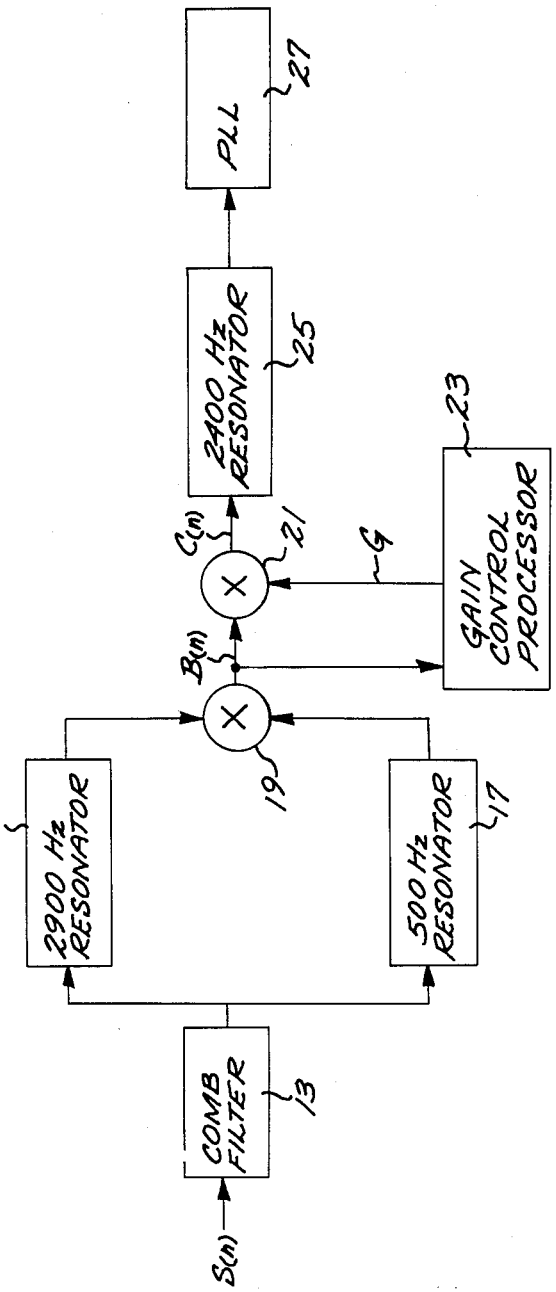

MODEM CLOCK WITH AUTOMATIC GAIN CONTROL

BACKGROUND OF THE INVENTION

1. Field of the Invention

The disclosed invention generally relates to data modems and particularly to clock recovery circuits used in the receivers of data modems. The invention is more particularly directed to gain control for modem envelope clock recovery.

2. Background Art

In synchronous data communications, modems are utilized to transmit information by modulating a carrier signal, and to receive information by demodulating a received signal. The timing in a modem receiver must be appropriately synchronized to the remote transmitter and such timing is based on information extracted from the received signal. A widely used approach to extract timing information includes the detection of the envelope of the modulated signal received by the receiver, which typically involves a non-linear process such as full-wave rectification, multiplication or squaring. Envelope derived timing recovery is commonly used since it is less complex than other techniques, which is an important consideration in microprocessor based modems.

U.S. Pat. No. 3,020,479, issued to Logan on Feb. 6, 1972, isolates the upper and lower sidebands of the received signal, multiplies the respective sidebands and extracts the timing signal from the product.

U.S. Pat. No. 3,524,023, issued to Whang on Aug. 11, 1970, translates the received signal to an intermediate frequency (I.F.), full-wave rectifies the I.F. signal, and filters out the timing signal.

Another technique involves extracting the Nyquist band edge frequencies by bandpass filtering, full wave rectifying the filtered signals, adding the filtered signals, and extracting the timing signal from the sum. This technique is disclosed in a paper "Envelope Derived Timing Recovery in QAM and SQAM systems," D. L. Lyon, *IEEE Transactions On Communications*, Vol. 23, No. 11, pp. 1327-31, November, 1975.

The detected envelope is utilized in the receiver as a local reference to synchronize the receiver timing to that of the remote transmitter. For example, for a transmitted symbol rate of 2400 symbols per second (baud), the detected envelope would have a frequency of 2400 Hz. Typically, the detected envelope is used as a reference signal for a phase lock loop (PLL) circuit which would provide a symbol rate timing signal at the frequency of the detected envelope and with a fixed phase relation to the detected envelope. The PLL circuit would also provide other timing signals of different frequencies but in synchronism with the symbol rate timing signal. In essence, the detected envelope provides a phase reference for the receiver symbol rate timing and other timing signals. For example, in digital implementations, such other timing signals would include analog-to-digital sample timing and equalizer timing.

Since the envelope is derived from the received signal, it includes distortions caused by the communications link, which may include telephone lines, microwave channels, or satellite channels. The nature and magnitude of such distortions typically vary with time and with the specific communications connections.

Distortion in the detected envelope, particularly amplitude distortion, will adversely affect the dynamic behavior of the timing recovery phase lock loop circuit. As is well known, inappropriate timing signals in the receiver can lead to inefficient or erroneous operation of modem receivers. For example, the effects of improper symbol timing on adaptive equalizers is discussed in "Timing Recovery in Synchronous Equalized Data Communication," *IEEE Transactions On Communications*, Vol. 23, No. 2, pp. 269-274, February, 1975.

More specifically, variations in the amplitude of the detected envelope as provided to the timing recovery PLL circuit affects the accuracy of its output. For example, if the amplitude of the input to the PLL circuit decreases below its nominal level, loop bandwidth decreases and Q increases, resulting in undesirable overshoot. Moreover, in digitally implemented systems, dynamic range is limited by the number of bits utilized to represent the digital samples. Substantial variations in the amplitude of the detected envelope could cause overflow or underflow.

SUMMARY OF THE INVENTION

It is, therefore, an object of the invention to provide an improved timing recovery circuit.

It is also an object of the invention to provide a timing recovery circuit which compensates for distortions introduced by the communications link.

Another object of the invention is to provide a timing recovery circuit which controls its gain as a function of the received signal.

Still another object of the invention is to provide an envelope detection timing recovery circuit which controls the amplitude of the detected envelope as a function of the received signal.

A further object of the invention is to provide an envelope detection timing recovery circuit which controls its gain as a function of the average power of the detected envelope.

The foregoing and other objects and purposes are accomplished in a timing recovery circuit which includes filter circuitry for extracting the upper and lower Nyquist band edge frequency components, a multiplier to multiply the upper and lower band edge components to provide a first product, a controlled multiplier to multiply the first product with a selected factor, a tank circuit tuned to the symbol frequency and a timing recovery phase lock loop circuit.

BRIEF DESCRIPTION OF THE DRAWING

The advantages and features of the disclosed invention will be readily appreciated by persons skilled in the art from the following detailed description when read in conjunction with the drawing wherein:

FIG. 1 is a schematic block diagram of a typical modem receiver in which the disclosed timing recovery circuit can be used.

FIG. 2 is a schematic diagram of the disclosed timing recovery circuit.

DETAILED DESCRIPTION

Figure 4:
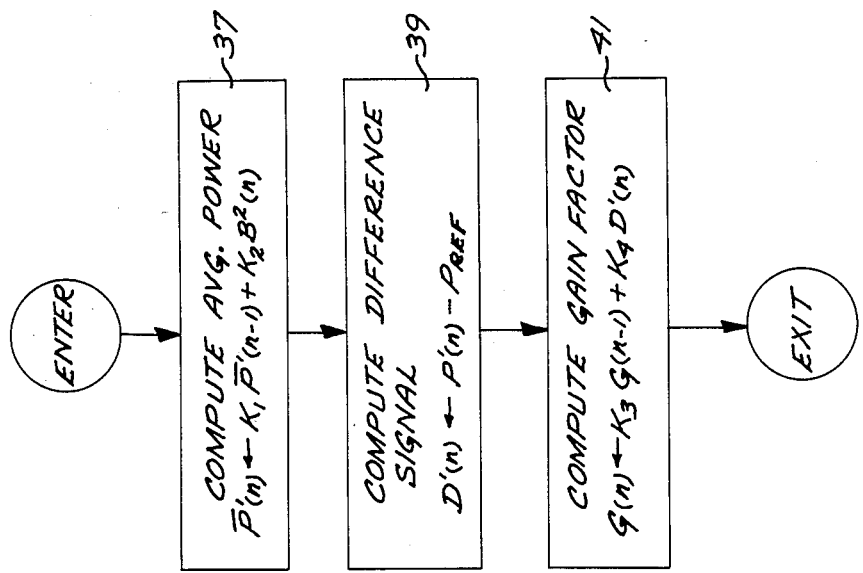
FIG. 4 is a functional flow diagram illustrating the functions performed in utilizing a computational technique to provide gain control utilized in the timing recovery circuit of FIG. 2.

In the following detailed description, like elements shown in the several figures of the drawing will be identified with like reference numerals. Also, for ease of understanding, the following description will generally be in the context of modems but will be readily appreciated as providing teachings applicable to other data communications receivers.

Referring now to FIG. 1, shown therein is a block diagram of a modem receiver 10 which, by way of example, operates at a symbol rate of 2400 baud and has a carrier frequency of 1700 Hz. The modulation period T is, therefore, equal to 1/2400 seconds for this particular example. The modem receiver 10 includes a receiver input circuit 20 which, by way of example, would generally include the receiver pre-amplifier, an anti-aliasing filter, a coarse automatic gain control (AGC), and other signal processing elements. The processed analog input data signal is sampled by an analog-to-digital (A/D) sampler 11, to provide a sampled input signal S(n) which is provided to a phase splitter 30.

The phase splitter 30 provides two signals, y and ỹ wherein ỹ is the Hilbert transform of y, and wherein such two signals have the same amplitude but are in quadrature (90 degrees apart in phase.) The phase splitter 30 also provides the receiver spectral shaping, which is typically one-half of the composite spectral shaping, the transmitter providing the other half.

The outputs of the phase splitter 30 are provided to an adaptive equalizer 40 which includes circuitry for equalizing the outputs of the phase splitter 30. The exemplary adaptive equalizer is a passband equalizer and by way of preferred example is a fractional equalizer wherein the equalizer taps are separated by less than the modulation iterval T. For example, the tap spacing could be 3T/4, whereby four taps would extend over three modulation intervals. A fractional equalizer, in contrast to an equalizer having taps separated by the modulation interval T, is insensitive to fixed timing phase errors since it has sufficient spectral resolution to compensate for such phase errors.

The equalized phase split signals are provided to a demodulator and detector 50 which includes balanced modulators and multipliers for demodulating the passband phase split signals to baseband quadrature components. For the equalized phase split signals y and ỹ, and for a carrier frequency of $\omega_c$ radians, the baseband signals $X_{bb}$ and $Y_{bb}$ achieved according to the following equations:

$$X_{bb} = y \cos \omega_c t + \tilde{y} \sin \omega_c t \qquad (Eq.1)$$

$$Y_{bb} = \tilde{y} \cos \omega_c t - y \sin \omega_c t \qquad (Eq.2)$$

A decision circuit is responsive to the baseband components and provides the receiver data output.

As discussed below, the A/D sampling rate of the sampler 11 is 9600 Hz which provides four samples for each modulation interval, wherein the samples are spaced by T/4 for the given example where T is 1/2400 seconds. The phase splitter 30 accepts the 9600 Hz sample rate and provides its phase split outputs at 9600 Hz. In the given example, the adaptive equalizer 40 is 3T/4 equalizer and, therefore, the equalizer 40 accepts every third output of the phase splitter 30. The equalizer input timing is 3200 Hz and is also provided by the timing recovery circuitry discussed below. It is contemplated that the output of the adaptive equalizer 40 be at the symbol rate, which for the disclosed example is 2400 Hz. The output timing for the equalizer is also provided by the timing recovery circuit discussed below.

The detector 50 functions at the symbol rate of 2400 Hz, and its timing is also provided by the timing recovery circuit.

The timing of the A/D sampler 11 is controlled by a timing recovery circuit 60 which utilizes the sampled signal S(n) as its input. Referring now to FIG. 2, shown therein is a schematic diagram of the timing recovery circuit 60 which includes a comb filter 13 for processing the sampled signal S(n). The comb filter 13 is a digital filter operating at 9600 Hz and includes multiple bandpasses equally spaced and having center frequencies $F_{cn}$ as follows:

$$F_{cn} = n(400) + 100, \ n = 1,11 \qquad (Eq.3)$$

Thus, the comb filter 13 includes, among its several bandpasses, two bandpasses which are centered at the Nyquist band edge frequencies of 500 Hz and 2900 Hz. The Nyquist band edge frequencies follow from the 2400 baud symbol rate and the 1700 Hz center. The Nyquist band is therefore 2400 Hz and is centered at 1700 Hz, which places the Nyquist band edges at 500 Hz and 2900 Hz, respectively.

The operation of the timing recovery circuit 60 may be best understood by considering the case where a deterministic periodic signal (e.g., a training pattern) is transmitted. For a carrier frequency fc, the transmitter output signal may be expressed as follows:

$$T(t) = a(t) \cos \omega_c t - b(t) \sin \omega_c t \qquad (Eq.4)$$

$$\omega_c = 2\pi f_c$$

In Equation 4, a(t) and b(t) are the Cartesian coordinates of the transmitted symbol. Such Cartesian coordinates have been frequency limited by low-pass filters to frequencies less than the carrier frequency $f_c$. Typically, the baseband transmit filters utilize a raised-cosine response with the −3 db point at a frequency equal to ½T, where T is the modulation period.

The Cartesian coordinates a(t) and b(t) have periodic components with periods of nT, where n is an even integer greater than or equal to 2. Therefore, there will be discrete frequency components with frequencies $f_n = 1/nT$, wherein the highest frequency is ½T since components of higher frequency will have been eliminated by the low pass filters. When these frequency components are modulated with the carrier signal, sidebands will be generated at the frequencies $f_c \pm f_n$. The baseband component having the baseband Nyquist frequency of ½T gives rise to components having frequencies of $f_c \pm \frac{1}{2}T$ which are utilized by the timing recovery circuit 60 to recover timing information.

In the disclosed example where the carrier frequency $f_c$ is 1700 Hz and 1/T is 2400 Hz, the baseband component having the baseband Nyquist frequency of ½T results in sidebands at 500 Hz and 2900 Hz, which are utilized to recover timing information.

The output of the comb filter 13 is applied in parallel to a 2900 Hz resonator circuit 15 and a 500 Hz resonator circuit 17. The 2900 Hz resonator circuit 15 is a digital implementation which operates at 9600 Hz and extracts frequency components around its 2900 Hz resonant frequency. Its output $X_1(t)$ can be represented as follows as to its resonant frequency:

$$X_1(t) = A_1 \cos(\omega_1 t) \quad \text{(Eq.6)}$$

$$\omega_1 = (2\pi)(2900) \quad \text{(Eq.7)}$$

The 500 Hz resonator circuit 17 is a digital implementation which operates at 9600 Hz and extracts frequency components around its 500 Hz resonant frequency. Its output $X_2(t)$ can be represented as follows as to its resonant frequency:

$$X_2(t) = A_2 \cos(\omega_2 t) \quad \text{(Eq.8)}$$

$$\omega_2 = (2\pi)(500 \text{ Hz}) \quad \text{(Eq.9)}$$

The resonator circuit outputs $X_1(t)$ and $X_2(t)$ are provided as inputs to a multiplier 19 which provides a product B as a result of the following non-linear function:

$$B(t) = X_1(t) X_2(t) \quad \text{(Eq.10)}$$

Substituting Equations 6 and 8:

$$B(t) = A_1 A_2 \cos(\omega_1 t) \cos(\omega_2 t) \quad \text{(Eq.11)}$$

$$B(t) = \tfrac{1}{2} A_1 A_2 [\cos(\omega_1 - \omega_2)t + \cos(\omega_1 + \omega_2)t] \quad \text{(Eq.12)}$$

$$\omega_1 - \omega_2 = 2\pi(2900 - 500) = 2\pi(2400) \quad \text{(Eq. 13)}$$

$$\omega_1 + \omega_2 = 2\pi(2900 + 500) = 2\pi(3400) \quad \text{(Eq. 14)}$$

Thus, the multiplier 19 provides frequency components which are the sums and differences of the frequencies of the resonator circuit outputs $X_1(t)$ and $X_2(t)$. As shown in Equation 13, the difference of the resonator circuit resonant frequencies is numerically equal to the symbol rate of 2400 baud. A difference frequency of 2400 Hz is also generated from energy about the resonant frequencies of 500 Hz and 2900 Hz from energy components which are separated by 2400 Hz.

For ease of understanding, the resonator circuit outputs $X_1$ and $X_2$, and the multiplier output B have been identified as varying with time t. In the contemplated digital implementation such outputs will, of course, be digital values. Therefore, such outputs will also be identified herein as $X_1(n)$, $X_2(n)$, and $B(n)$, thereby denoting the $n^{th}$ digital value. For ease of reference, the multiplier output $B(n)$ will also be referred to as the reference signal.

The multiplier output $B(n)$ is provided to a gain control multiplier 21, which provides an output $C(n)$ that is the gain controlled envelope. As more fully discussed below, a gain control processor 23 is responsive to the samples $B(n)$ and ascertains the average power of the sample $B(n)$.

The output of the gain control multiplier 21 is provided to a 2400 Hz resonator circuit 25 which extracts components around its 2400 Hz resonant frequency. The 2400 Hz resonator circuit 25 is a digital implementation and its output is provided to a phase lock loop (PLL) circuit 27 which acquires and tracks the frequency and phase of the 2400 Hz component. The PLL circuit 27 provides the symbol timing signal and other timing signals used in the modem receiver 10. Specifically, for the given example of a symbol rate of 2400 baud and a fractional 3T/4 adaptive equalizer, the PLL circuit 27 provides a 9600 Hz timing signal for the A/D sampler 11, a 3200 Hz timing signal for the adaptive equalizer 40, and a 2400 Hz symbol rate timing signal for the equalizer output and the detector 50. Of course, other appropriate timing signals referenced to the phase of the detected envelope can be generated by the PLL circuit 27.

Gain control as accomplished by the gain control processor 23 and the gain control multiplier 21 can be achieved in two modes. The first mode is the fixed mode wherein the gain factor G is initially determined from a predetermined number of samples B, and once determined remains constant for a particular data connection. The second mode is the tracking mode wherein the gain factor G can adaptively vary with the received signal.

For fixed mode operation, the average power can be readily calculated by accumulating a predetermined number of squares or absolute values of the detected envelope samples B in an accumulator and dividing the accumulated value by such predetermined number. Preferably, the predetermined number of samples is a power of two so that the division can be readily accomplished by appropriately shifting the accumulated value.

In the tracking mode the average power of the $n^{th}$ sample $B(n)$ is calculated continually with the received signal. By way of example, two techniques for calculating average power are discussed.

The first technique is directed to calculating the average power $\overline{P}(n)$ from a predetermined number (N) of samples $B(i)$:

$$P(n) = \frac{1}{N} \sum_{i=1}^{N} B^2(n-i) \quad \text{(Eq. 15)}$$

The difference or error signal D is computed relative to a reference threshold level $P_{REF}$:

$$D(n) = P(n) - P_{REF} \quad \text{(Eq. 16)}$$

On the basis of the value of $D(n)$ a gain factor G is determined by a look-up table technique or by a computational technique as discussed further herein.

An alternative computation of average power $\overline{P}'(n)$ for the $n^{th}$ digital output $B(n)$ is as follows:

$$P'(n) = K_1 P'(n-1) + K_2 B^2(n) \quad \text{(Eq. 17)}$$

$K_1$ and $K_2$ are initially chosen constants. The error signal $D'(n)$ is computed relative to the reference threshold level $P_{REF}$:

$$D'(n) = P'(n) - P_{REF} \quad \text{(Eq. 18)}$$

On the basis of the value of $D'(n)$, a suitable gain factor G is determined by a look-up table technique or by a computational technique as discussed further herein.

It will be readily understood that computing average power in accordance with Equation 15 requires the storage of N squares or absolute values of the samples $B(n)$, which would be an important consideration if a large number of sample values is utilized. In contrast, computing average power in accordance with recursive Equation 17 requires only the present squared detected envelope sample and the prior computed average power value. The values calculated according to Equation 17 become stable after some initial time period and tend to provide the mean value of the square of the samples $B(n)$.

In the disclosed timing recovery circuit 60, it is contemplated that the gain control processor 23 be implemented with a microprocessor and appropriate processing instructions. By way of example, it is specifically contemplated that the gain control processor 23 determine the gain control factor G by a look-up table technique or by a computational technique.

Figure 3:
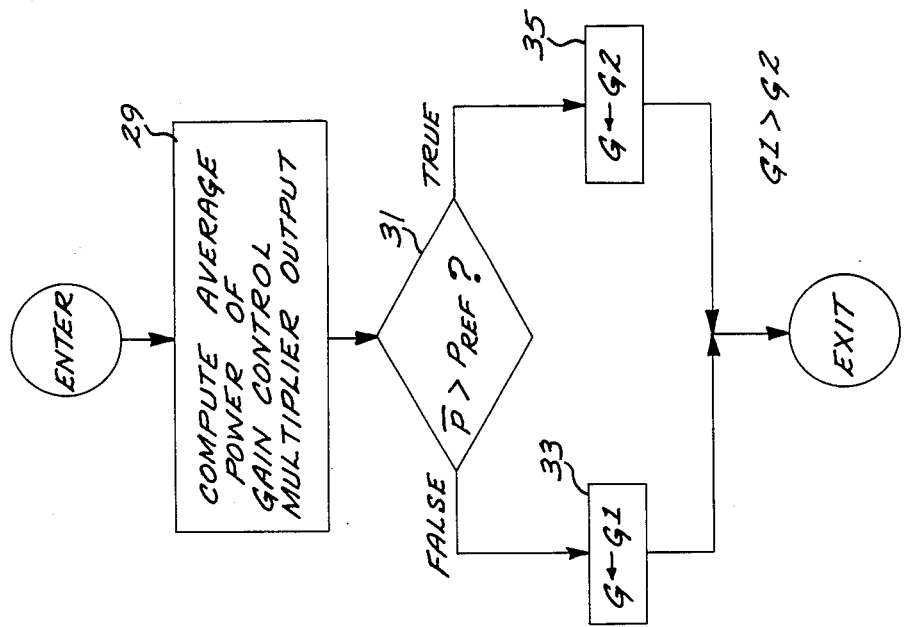
FIG. 3 is a functional flow diagram illustrating the functions performed utilizing a look-up table to provide gain control in the timing recovery circuit of FIG. 2.

FIG. 3 sets forth a flow diagram for calculating the gain factor G by reference to a look-up table which includes two possible values for the gain control factor G. The two values are G1 and G2, wherein G1 is greater than G2. The first function is the calculation of the average power $\bar{P}$ as illustrated in the function block 29. Either of the above described techniques (Equation 15 or 17) can be utilized. Then a decision is made in a decision block 31 to determine whether the calculated average power $\bar{P}$ is greater than a predetermined reference $P_{REF}$. If the decision is false, the gain factor G is assigned the greater predetermined value G1, as indicated in the function block 33. If the decision from 31 is true, then the gain factor G is assigned the lesser predetermined value G2. The flow of FIG. 3 is then exited until the next time the gain factor G is calculated. By way of example, the flow of FIG. 3 can be performed for each sample B(n) or less frequently.

In determining the gain factor G(n) by computation, Equations 15 or 17 may be used to determine average power $\bar{P}$ or $\bar{P}'$. For this example, Equation 17 will be assumed as providing average power, and the gain factor G(n) can be calculated as follows:

$$G(n) = K_3 G(n-1) - K_4 D'(n) \qquad \text{(Eq. 19)}$$

The constants $K_3$ and $K_4$ are determined suitably.

Referring now to FIG. 4, shown therein is a flow diagram for calculating the gain control factor G in accordance with Equations 17 through 19. In the first functional block 37, the average power is calculated relative to the prior average power $\bar{P}'(n-1)$. In the functional block 39, the error signal $D'(n)$ is calculated. On the basis of the error signal $D'(n)$, an updated gain factor G(n) is calculated in the function block 41. The flow of FIG. 4 may be repeated for each sample B(n) or less frequently.

It should be noted that in determining the gain control factor G in accordance with Equations 17 through 19 there is an asymptotic limit for G in the event the power $\bar{P}'(n)$ goes to zero. That limit is determined by the constants $K_3$ and $K_4$ in Equation 19. When the average power $\bar{P}'(n)$ is zero, then the error signal is equal to $P_{REF}$ so long as the average power $\bar{P}'(n)$ remains at zero. Assuming that the gain control factor G(n) is $G_0$ when the detected envelope power goes to limit of the zero at n=0, then the zero energy gain can be determined as follows:

$$G(1) = K_3 G_0 - K_4 D(0) \qquad \text{(Eq. 20)}$$

$$G(1) = K_3 G_0 + K_4 P_{REF} \qquad \text{(Eq. 21)}$$

$$G(2) = K_3 G(1) - K_4 D(1) \qquad \text{(Eq. 22)}$$

$$G(2) = K_3 [K_3 G_0 + K_4 P_{REF}] + K_4 P_{REF} \qquad \text{(Eq. 23)}$$

$$G(2) = K_3^2 G_0 + (1 + K_3) K_4 P_{REF} \qquad \text{(Eq. 24)}$$

$$G(3) = K_3 G(2) + K_4 P_{REF} \qquad \text{(Eq. 25)}$$

$$G(3) = K_3 [K_3^2 G_0 + (1 + K_3) K_4 P_{REF}] + K_4 P_{REF} \qquad \text{(Eq. 26)}$$

$$G(3) = K_3^3 G_0 + (1 + K_3 + K_3^2) K_4 P_{REF} \qquad \text{(Eq. 27)}$$

From the foregoing, the following generalized equations are appropriate for the $k^{th}$ sample:

$$G(k) = K_3^k G_0 + (1 + \ldots + K_3^{k-1}) K_4 P_{REF} \qquad \text{(Eq. 28)}$$

$$G(k) = K_3^k G_0 + \left( \sum_{i=0}^{\infty} K_3^i - \sum_{i=k}^{\infty} K_3^i \right) K_4 P_{REF} \qquad \text{(Eq. 29)}$$

$$G(k) = K_3^k G_0 + \frac{K_4 P_{REF}(1 - K_3^k)}{1 - K_3}, \quad K_3 < 1 \qquad \text{(Eq. 30)}$$

As k goes to infinity, then:

$$\lim_{k \to \infty} G(k) = \frac{K_4 P_{REF}}{1 - K_3} \qquad \text{(Eq. 29)}$$

From the foregoing, it is evident that the parameters $K_3$ and $K_4$ control the limiting value for the gain control factor G and also the rate at which the gain control factor changes.

The foregoing analysis assumes that the average power is zero at n=0. However, during an actual occurrence of lack of energy at the Nyquist band edges, the average power $\bar{P}'$ will decay exponentially in accordance with the value chosen for $K_1$ in Equation 17. The values for $K_1$ and $K_2$ in Equation 17 control the dynamics of the average power calculation which is in effect a simple low pass filter with the following transfer function:

$$H(z) = \frac{K_2}{1 - K_1 z^{-1}} \qquad \text{(Eq. 32)}$$

As $K_1$ increases to unity, the filter bandwidth decreases and its settling time increases. An appropriate compromise must, therefore, be chosen. It is further noted that for stability reasons $K_1$ and $K_2$ must each be less than one.

In the foregoing described timing recovery circuit 60, gain control results in advantageous design and operation of the PLL circuit 27. Since there is greater predictability as to the range of the output values C(n) of the gain control multiplier 21, then the nominal parameters of the PLL circuit 27 can be more precisely determined and controlled. The PLL circuit 27 operation will be improved since its input is controlled to remain within predetermined levels.

In the foregoing described embodiments, the gain control multiplier 21 operates on the output of the multiplier 19. In another contemplated embodiment, the gain control multiplier can operate on the sampled signal S(n) to provide the input to the comb filter 13. Also, a gain control multiplier could operate on the output of the comb filter 13 to provide the input to the 2900 Hz resonator 15 and the 500 Hz resonator 17. It is also contemplated that respective gain control multipliers could operate on the respective outputs of the 2900 Hz resonator 15 and the 500 Hz resonator 17 and thereby provide inputs to the multiplier 19.

It should also be noted that the signal envelope can be recovered from the outputs of the phase splitter 30. The disclosed principles for adaptively controlling the gain are readily applicable to such signal envelope recovery.

Although the foregoing has been a description of preferred embodiments of the disclosed invention, changes and modifications thereto can be made by persons skilled in the art without departing from the scope and spirit of the invention as defined by the following claims.

What is claimed is:

1. A modem clock recovery system comprising:
a comb filter responsive to a data modulated received signal for providing a comb filter output;
resonator means responsive to said comb filter output for providing Nyquist band edge components:
means responsive to said Nyquist band edge components for providing a reference signal having a clock timing component; and
gain control means responsive to said reference signal for adaptively controlling the gain of said reference signal having a clock timing component.

2. The clock recovery system of claim 1 wherein said gain control means comprises:
means for determining the average power of said reference signal, and for providing a gain control factor as a function of said average power; and
means for controlling the level of said Nyquist band edge components in response to said gain control factor.

3. The clock recovery system of claim 2 wherein said level controlling means comprises means for multiplying said comb filter output by said gain control factor.

4. The clock recovery system of claim 2 wherein said level controlling means comprises means for multiplying said Nyquist band edge components by said gain control factor.

5. The clock recovery system of claim 2 wherein said average power determining means includes a look-up table with predetermined values and from which the gain control factor is selected as a function of said average power of said reference signal.

6. The clock recovery system of claim 5 wherein said look-up table includes at least two predetermined values.

7. The clock recovery system of claim 2 wherein said average power determining means computes the gain control factor in accordance with a predetermined equation.

8. A gain controlled clock recovery system for a modem comprising:
means for extracting timing information from a data modulated received signal that includes said timing information;
means responsive to said timing information for providing a reference signal having a clock timing component;
means for determining the average power of said reference signal, and for providing a gain control factor as a function of said average power; and
means for multiplying said reference signal by said gain control factor to provide a gain controlled reference signal having a clock timing component.

9. The clock recovery system of claim 8 wherein said reference signal comprises a series of samples and wherein said average power determining means determines said average power from a predetermined number of said samples.

10. The clock recovery system of claim 8 wherein said reference signal comprises a series of samples, and wherein said average power determining means determines said average power for the $n^{th}$ sample in accordance with the following recursive equation:

$$\overline{P}(n) = K_1 \overline{P}(n-1) + K_2 B^2(n)$$

where $\overline{P}(n)$ is the average power of the $n^{th}$ sample, $\overline{P}(n-1)$ is the average power of the prior sample, $K_1$ and $K_2$ are constants which are less than unity, and $B(n)$ is the $n^{th}$ sampled reference signal.

11. The clock recovery system of claim 8 wherein said average power determining means includes a look-up table with predetermined values and from which the gain control factor is selected as a function of said average power of said reference signal.

12. The clock recovery system of claim 11 wherein said look-up table includes at least two predetermined values.

13. The clock recovery system of claim 8 wherein said average power determining means computes the gain control factor in accordance with a predetermined equation.

14. The clock recovery system of claim 8 wherein said reference signal comprises a series of samples and wherein said average power determining means computes the gain control factor for the $n^{th}$ sample in accordance with the following recursive equation:

$$G(n) = K_3 G(n-1) = K_4 D(n)$$

where $G(n)$ is the gain control factor for the $n^{th}$ sample, $G(n-1)$ is the gain control factor for the prior sample, $K_3$ and $K_4$ are constants, and $D(n)$ is the difference between a reference power level and the average power of the $n^{th}$ sample.

* * * * *